(12) United States Patent
Pothering et al.

(10) Patent No.: US 8,380,759 B2
(45) Date of Patent: Feb. 19, 2013

(54) TYPE PROJECTION QUERY OF AN INSTANCE SPACE

(75) Inventors: Joel Pothering, Seattle, WA (US);
Jakub Oleksy, Woodinville, WA (US);
Ashvinkumar J. Sanghvi, Sammamish, WA (US); Pratibha Mallya, Bellevue, WA (US); Murat Ersan, Ankara (TR); Bogdan Berce, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 12/623,378

(22) Filed: Nov. 21, 2009

(65) Prior Publication Data

US 2011/0125737 A1    May 26, 2011

(51) Int. Cl.
*G06F 17/00* (2006.01)
(52) U.S. Cl. ........ 707/804; 707/769; 707/798; 707/812; 707/802
(58) Field of Classification Search .......... 707/812, 707/802, 804, 769, 798
See application file for complete search history.

(56) References Cited

U.S. PATENT DOCUMENTS

| | | | |
|---|---|---|---|
| 6,829,615 B2 | 12/2004 | Schirmer et al. | |
| 7,478,102 B2 | 1/2009 | Ellis et al. | |
| 7,512,885 B2 | 3/2009 | Walsh et al. | |
| 7,865,533 B2 * | 1/2011 | Meijer et al. | 707/804 |
| 2005/0120027 A1 | 6/2005 | Ter Horst | |
| 2007/0011649 A1 | 1/2007 | Venolia | |
| 2008/0313119 A1 | 12/2008 | Leskovec et al. | |

OTHER PUBLICATIONS

Oleksy, "Service Manager m2010 Beta 2 Release" Oct. 6, 2009, http://blogs.msdn.com/jakubolesky/, 14 pages.
Benzaken, "Type-Based XML Projection" Sep. 12-15, 2006, $32^{nd}$ International Conference on Very Large Databases (VLDB '06), 12 pages.

* cited by examiner

*Primary Examiner* — Sana Al Hashemi
(74) *Attorney, Agent, or Firm* — Hope Baldauff Hartman, LLC

(57) ABSTRACT

Technologies are described herein for applying type projection queries to instance space graphs. Through the utilization of the technologies and concepts presented herein, a type projection may be used to describe the hierarchy of instance types connected by relationships within an instance space graph. A type projection query based on the type projection may be dynamically generated to query instances and relationships within the instance store. Filter criteria for the query can be expressed using a path notation. Results from of the type projection query may be provided as graphs of instances and relationships which are subgraphs of the queried instance space graph. Programmatic traversal of the resultant subgraph can navigate to each instance node within the result space.

20 Claims, 6 Drawing Sheets

TYPE PROJECTION QUERY OF AN INSTANCE SPACE

BACKGROUND

Management systems, such as those used in information technology (IT) operations, can track various instances in part by storing information about those instances. Instances may be hardware such as a computer or network device, software such as an operating system or user application, incidents, change orders, work tickets, or various other entities tracked within the management system.

Information stored by the management system regarding the tracked instances may include relationships between instances. For example, a peripheral may have a relationship to a computer that it is part of or connected to. Similarly, an operating system, or other software, may be related to a computer by being installed on that computer. A work ticket may be related to a network router because the work ticket suggests replacing the router.

Information stored by management systems is generally stored within a database. It is desirable to retrieve information about instances from the database based on relationships between the instances and various other instances. For example, a system manager may wish to retrieve information regarding the operating system installed on computers that are related to a certain type of network device and also related to an incident. Such retrieval generally requires making multiple queries, processing and comparing the results, and establishing the desired output according to the relationships retrieved from the database queries.

It is with respect to these and other considerations that the disclosure made herein is presented.

SUMMARY

Technologies are described herein for type projection queries on instance spaces. A management system is provided in one embodiment that can store information about entities tracked by the management system as instances. Each instance may be of one or more types, may have properties, and may relate to other instances. The information may be placed in an object model store referred to as an instance store and may be represented as an instance space graph where each node of the graph is an instance and each edge of the graph is a relationship between the instances connected by that edge.

Through the utilization of the technologies and concepts presented herein, a type projection may also be used to describe the hierarchy of instance types connected by relationships within an instance space graph. A type projection query based on the type projection may be dynamically generated to query instances and relationships within the instance store. Filter criteria for the query can be expressed using a path notation. The path notation can apply filters to individual nodes along paths within the instance space graph. Results from the type projection query may be provided as graphs of instances and relationships which are subgraphs of the queried instance space graph. The resultant subgraph from the type projection query can represent a hierarchical result set of instances and their relationships. Programmatic traversal of the subgraph can navigate to each instance node within the result space.

It should be appreciated that the above-described subject matter may be implemented as a computer-controlled apparatus, a computer process, a computing system, or as an article of manufacture such as a computer-readable medium.

These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
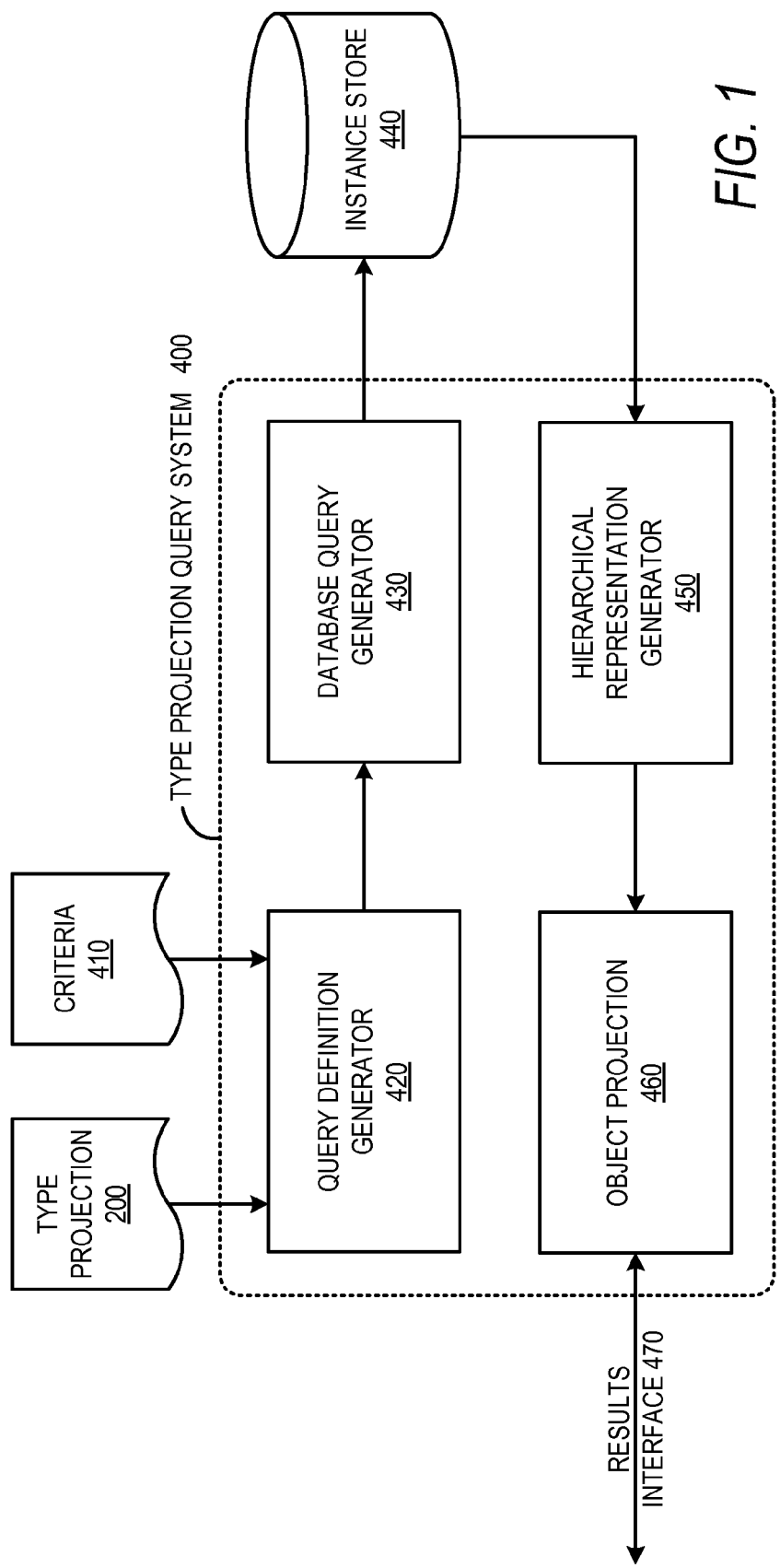
FIG. 1 is a block diagram illustrating a type projection query system according to one or more embodiments presented herein.

The following detailed description is directed to technologies for applying type projection queries to instance space graphs. Through the utilization of the technologies and concepts presented herein, type projection queries may be dynamically generated to query instances and relationships making up an instance space stored within an instance store. A type projection query is a query that retrieves instances according to specified instance types where the instances are related in a structure according to specified relationship types. The instance types and relationship types make up a type projection. Type projection query results may be provided as a graph of related instances providing a hierarchical view of a subgraph of the instance space. One example application of type projection queries may be to populate a user interface form with properties from several related types. The form can reference a type projection and a type projection query may be issued to retrieve all of the instances to populate the form from a single query.

Examples of management systems used in IT operations may include SYSTEM CENTER from MICROSOFT CORPORATION, SYSTEM CENTER SERVICE MANAGER (SCSM) from MICROSOFT CORPORATION, or SYSTEM CENTER OPERATIONS MANAGER (SCOM) from MICROSOFT CORPORATION. Such systems can store and track information about instances of hardware, software, infrastructure, licenses, users, events, incidents, service requests, trouble reports, management processes, and so forth associated with IT operations. The technology discussed herein may also be applied to management systems for financial operations, human resources, logistics, compliance management, or various other management operations whether related to IT or not.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, concepts and technologies for type projection queries on instance spaces will be described.

Turning now to FIG. 1, a block diagram illustrates a type projection query system 400 according to one or more embodiments presented herein. A type projection query is a query that can retrieve instances according to specified instance types where the instances may be related in a structure according to specified relationship types. The instance types and relationship types make up a type projection. The type projection 200 and a set of criteria 410 for filtering may be used by a query definition generator 420 to produce a generic query. The query definition generator 420 can use information about how instances are stored in the instance store 440 to form a query strategy to satisfy the type projection 200 and the criteria 410.

A database query generator 430 can accept the generic query produced by the query definition generator 420 and then provide the specific database query language for retrieving information from the instance store 440. The database query generator 430 can use information about the specific tables within the database housing the instance store 440. In a system where the instance store 440 is stored in an SQL database, the database queries generated by the database query generator 430 may be SQL queries.

The database queries generated by the database query generator 430 may be queried against the instance store 440. The results of this database query may be received by a hierarchical representation generator 450. In a system where the instance store 440 is stored in an SQL database, these results may be a relational set of data. The hierarchical representation generator 450 can generate a composite result from the results of the database query from the instance store 440. The composite result may be generated by connecting the retrieved information regarding instances and relationships into a resultant subgraph.

An object projection 460 may provide information detailing the results of the type projection query as a resultant subgraph. These results may be exposed to a results interface 470. Through the results interface 470, the resultant subgraph may be traversed to identify desired results of the type projection query. The results interface 470 may be implemented as any software, command, or protocol interface such as a library or an application programming interface (API).

The type projection query system 400 may include the query definition generator 420, database query generator 430, hierarchical representation generator 450, and object projection 460. These components may be implemented as separate modules or together as one system. The type projection query system 400 may be subdivided into modules as illustrated, differently, in whole, or in part. The type projection query system 400 may operate in conjunction with a database for housing the instance store 440 or the instance store 440 may be stored within, or in association with, type projection query system 400

Figure 2:
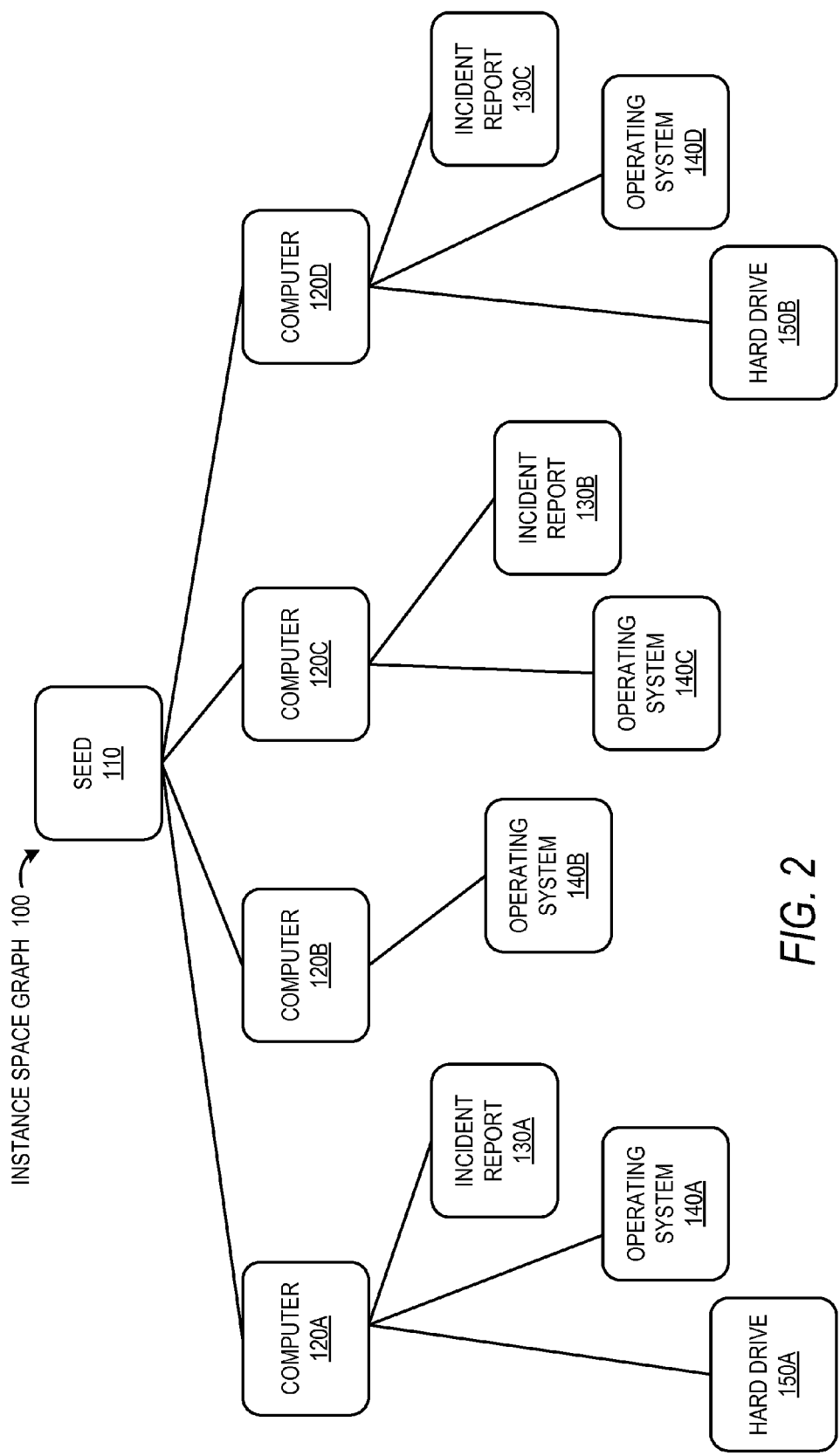
FIG. 2 is a schematic diagram illustrating an instance space graph used for type projection queries according to one or more embodiments presented herein.

Referring now to FIG. 2, a schematic diagram illustrates an instance space graph 100 used for type projection queries according to one or more embodiments presented herein. The instances and relationship information within the instance store 440 may be represented as an instance space graph 100. Each node of an instance space graph can represent an instance. For example, a first node of the instance space graph 100 represents a seed 110 as the root of the instance space graph 100. The seed 110 represents an instance, such as a service request, computer group, or so forth. The seed 110 may also represent the whole of the instances associated with the seed 110. Additional nodes of the instance space graph 100 may represent computers 120A-120D, incident reports 130A-130C, operating systems 140A-140D, and hard drives 150A-150B. Each edge of the instance space graph 100 represents a relationship between the instances connected by that edge. For example, the computer 120A is related to incident report 130A, operating system 140A, and hard drive 150A.

The incident report 130A may be an instance that relates to the computer 120A instance because the incident report 130A records details of an incident that occurred on, or in association with, the computer 120A. Similarly, the operating system 140A may be installed on the computer 120A and the hard disk 150A may be a peripheral of the computer 120A. While the instance space graph 100 may aid in visualizing relationships between the instances, retrieving instances from a database based upon these relationships may require multiple steps to collect and relate various sets of instances. The type projection query, as discussed herein, may be used to perform these database retrievals with reduced complexity.

Figure 3:
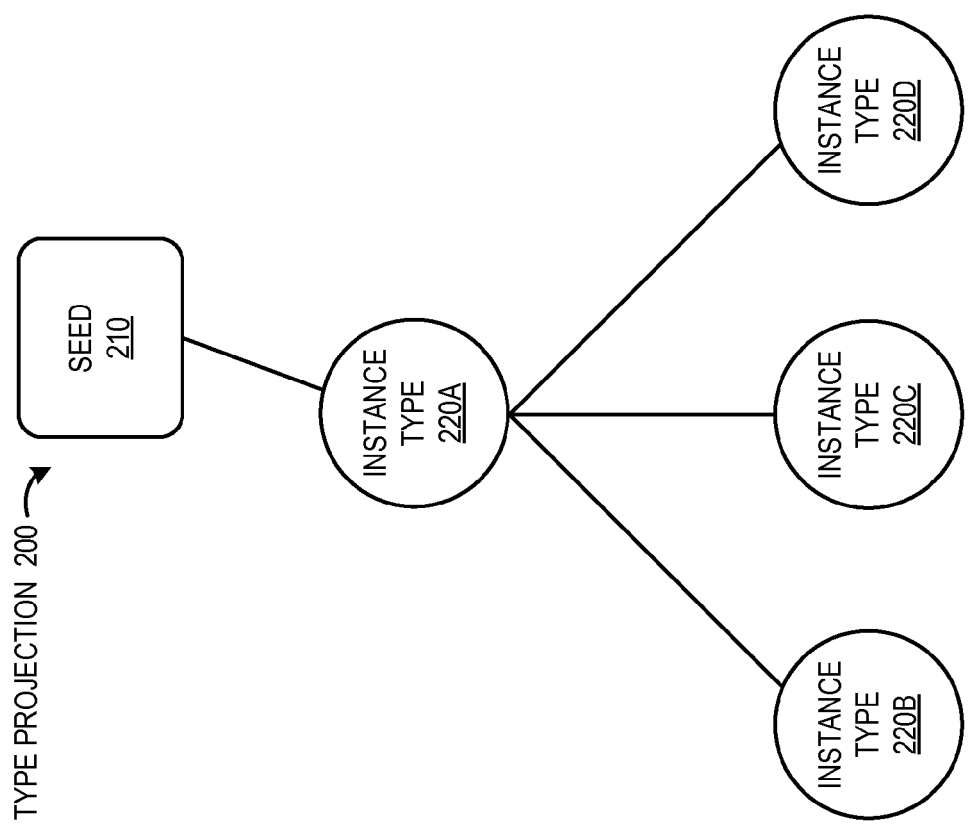
FIG. 3 is a schematic diagram illustrating a type projection according to one or more embodiments presented herein.

Referring now to FIG. 3, a schematic diagram illustrates a type projection 200 according to one or more embodiments presented herein. The type projection 200 can be represented as a graph describing a hierarchy of instance types connected by relationship types. The type projection 200 can have the seed 210 as its root node. The seed 210 may represent an instance type or the whole of instance types 220A-220D associated with the seed 210. The first instance type 220A may connect to the seed 210. Additional instance types 220B-220D may be related to the first instance type 220A. For example, the first instance type 220A may describe types of computers, such as computers 120A-120D within the instance space graph 100. The instance type 220B may describe types of peripherals, such as the hard drives 150A-150B. The instance type 220C may describe types of operating systems, such as the operating systems 140A-140D. The instance type 220D may describe types of events, such as the incident reports 130A-130C.

The edges between instance type nodes within the type projection 200 can define relationship types between the instances types 220A-220D. The relationships may be strongly typed. Such strong typing may support a path notation for instances and relations between instances. Accurate traversal of the instance relationships in the instance space and resultant subgraph may be supported by the strong typing and path notation.

According to one or more examples, the relationship type between instance type 220A and instance type 220C may include an "installed on" relationship. This may capture subgraphs from the instance space graph 100 where the operating system 140A-140D falling within instance type 220C is installed on the computer 120A-120D falling within instance type 220A.

While the type projection 200 may be represented as a graph, it should be appreciated that the type projection 200 may be described through several formats. Any of these formats may be used to describe the type projection 200 as a set of specified instance types 220A-220D along with specified relationships or paths between pairs of the specified instance types 220A-220D. According to one or more embodiments, the type projection 200 may be described using extensible markup language (XML).

An example XML definition of a type projection 200 is illustrated in Table 1. The example describes a top level type called the seed A, with two children Components B and C connected by relationship types "AtoB" and "AtoC" respectively. The Component B has a Component D connected by relationship type "BtoD."

TABLE 1

```
<TypeProjection ID="ProjectionA" Type="A">
    <Component Type="B" Path="Relationship='AtoB'$">
        <Component Type="D" Path="Relationship='BtoD'$"/>
    </Component>
    <Component Type="C" Path="Relationship='AtoC'$"/>
</TypeProjection>
```

Figure 4:
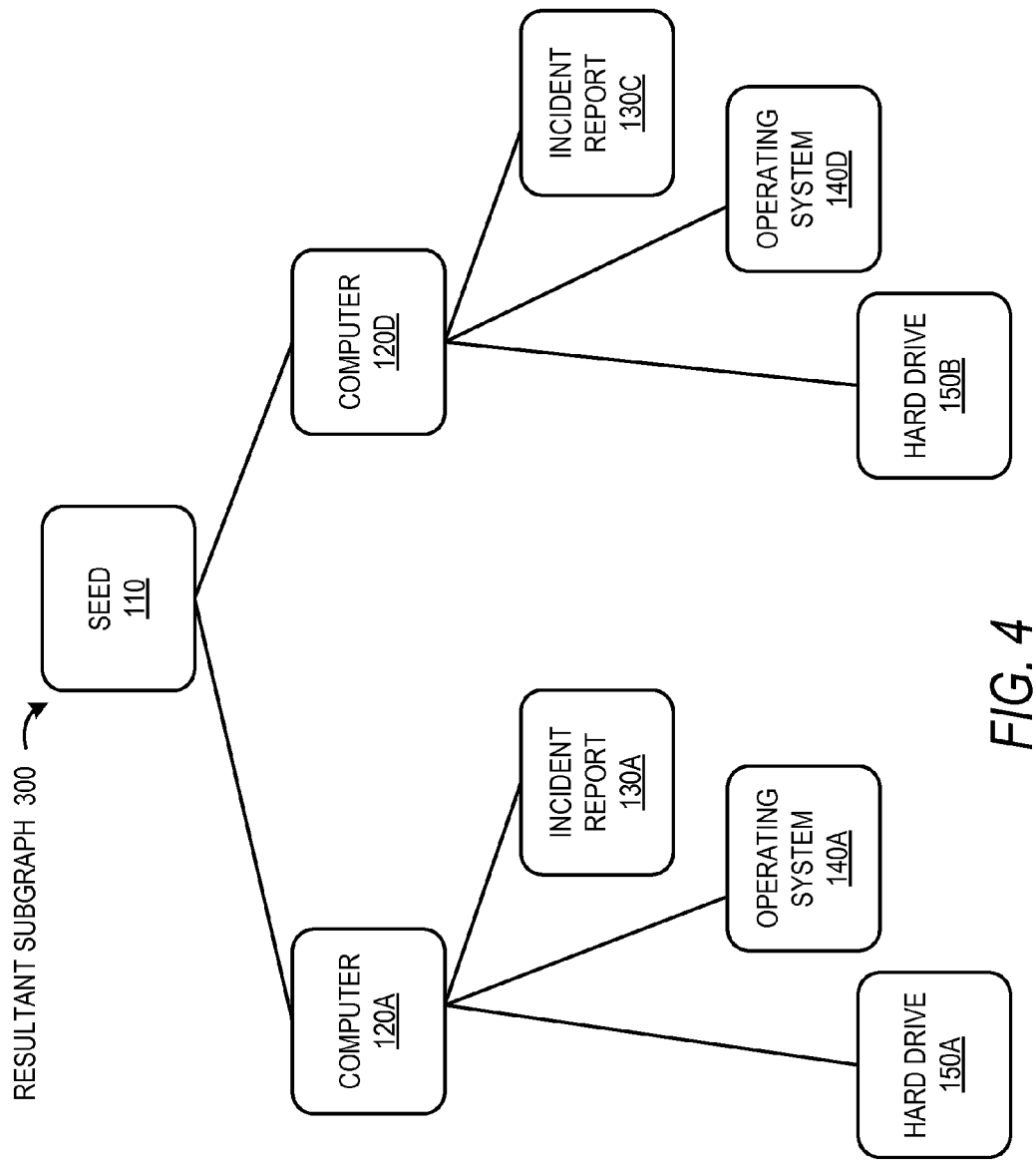
FIG. 4 is a schematic diagram illustrating a resultant subgraph according to one or more embodiments presented herein.

Referring now to FIG. 4, a schematic diagram illustrates a resultant subgraph 300 according to one or more embodiments presented herein. Applying the structure of the type projection 200 to query from the instance store 440 can capture relationships from the instances within the instance space graph 100 while avoiding separate queries for the various instances followed by searching, matching, and analysis to determine the relationships between all of the separately retrieved instances.

The result of such a type projection query may be represented as a resultant subgraph 300 that is a subgraph of the instance space graph 100. The resultant subgraph 300 can include portions of the instance space graph 100 having the structure of the type projection 200 and meeting any additionally specified criteria 410 of the type projection query. Criteria 410 may be provided along with the type projection 200 to support type projection queries that filter against specific properties for instances and relationships according to the specified criteria 410. Navigation through, or programmatic traversal of, the resultant subgraph 300 can support identifying instances and their relationships within the results of the type projection query.

When a projection query using the type projection 200 is applied to the instance space graph 100, the structure of the type projection 200 defines a set of instance types and relationship types for identifying areas of the instance space graph 100. According to the illustrated example, two areas are identified. These two areas are then included in the resultant subgraph 300. The first identified area includes computer 120A according to first instance type 220A, the hard drive 150A according to the instance type 220B, the operating system 140A according to the instance type 220C, and the incident report 130A according to the instance type 220D. The second identified area includes computer 120D according to first instance type 220A, the hard drive 150B according to the instance type 220B, the operating system 140D according to the instance type 220C, and the incident report 130C according to the instance type 220D. The areas of the instance space graph 100 rooted at computer 120B and at computer 120C do not have structure matching the type projection 200 and thus may not be included in the resultant subgraph 300.

For an area of the instance space graph 100 to match the type projection 200 during the type projection query, the instances within the instance space graph 100 can be within the corresponding instance types 220A-220D of the type projection 200. Also, the relationships between the instances of the instance space graph 100 may be within the relationship types of the type projection 200. For example, the relationship type between type instance 220A and type instance 220B in the type projection 200 may be related to a "contains" relationship such that the computer 120A should "contain" the hard drive 150A. In that case, if the relationship between computer 120D and hard drive 150B is "has access to" and not "contains" then the relationship between computer 120D and hard drive 150B may not be captured by the type projection 200. In such an example, computer 120D, hard drive 150B, operating system 140D, incident report 130C, and their interconnecting relationships would not be included in the resultant subgraph 300. The type projection 200 specifies both instance types 220A-220D and interconnecting relationship types that are used against the instance space graph 100 during a type projection query.

In addition to the instance types 220A-220D and interconnecting relationship types provided by the type projection 200, a type projection query may also be specified by criteria 410 for filtering. The criteria 410 may be specified for any one of the instances and relationships within the type projection 200. The criteria 410 may specify properties or groupings. For example, criteria 410 may be specified in association with the instance type 220A of the type projection 200 to filter for computers 120A-120D having a particular manufacturer or a particular processor type. The criteria 410 for filtering may be specified as a graph or as one or more paths within a graph. A path notation may be used to specify the criteria applied to instances along one or more paths within a graph. The criteria 410 can be expressed in various formats including XML.

According to some embodiments, filter criteria 410 may be specified as type and group memberships. For example, computers 120A-120D may be filtered as being of a type or subtype specified by a domain or type of operating system. The computers 120A-120D may also be filtered as being in a certain group such as those in the finance department. Similarly, satisfaction of these filtering criteria 410 may be similar to object inheritance. For example, a computer system of a specific type or application may inherit also being a computer and thus inherit all of the properties of a computer.

According to some other embodiments, filter criteria 410 may be specified as cardinality of relationships. For example, computers 120A-120D may be filtered as having two or more hard drives 150A-150B such that computers 120A-120D having only one hard drive are not captured by the type projection query. According to yet some other embodiments, filter criteria 410 may support sorting, paging, streaming, aggregation, or any other processing or manipulation of instance and relationship information within the type projection query.

To perform the type projection query, a database query can be generated from the type projection 200. Starting at the seed 210, each relationship type may be joined to each instance type. These joins may perform a traversal of the nodes seed 210 to instance type 220A, from instance type 220A to instance type 220B, from instance type 220A to instance type 220C, and from instance type 220A to instance type 220D. In the structured query language (SQL) for querying databases, such joining may be implemented as an outer join. An outer join can search two or more tables and find results even without the tables containing a matching record.

An example XML definition for filter criteria 410 is illustrated in Table 2. This example criteria 410 corresponds to the XML type projection 200 example illustrated in Table 1. In this example, criteria can filters on a property value of the instance D. A Path in the property tag can define navigation to the property name on instance D. The value of name may then be compared to the literal "D1." If the criteria matches, all instances and relationships traversed may be returned for each instance.

TABLE 2

```
<Criteria>
    <Expression>
        <Operand>
            <Property>/Path[Seed]/Path[Relationship='AtoB'] ...
                /Path[Relationship='BtoD']/Property[Type='D']/Name</Property>
        </Operand>
        <Operator>Equal</Operator>
        <Operand>
            <Value>D1</Value>
        </Operand>
    </Expression>
</Criteria>
```

Figure 5:
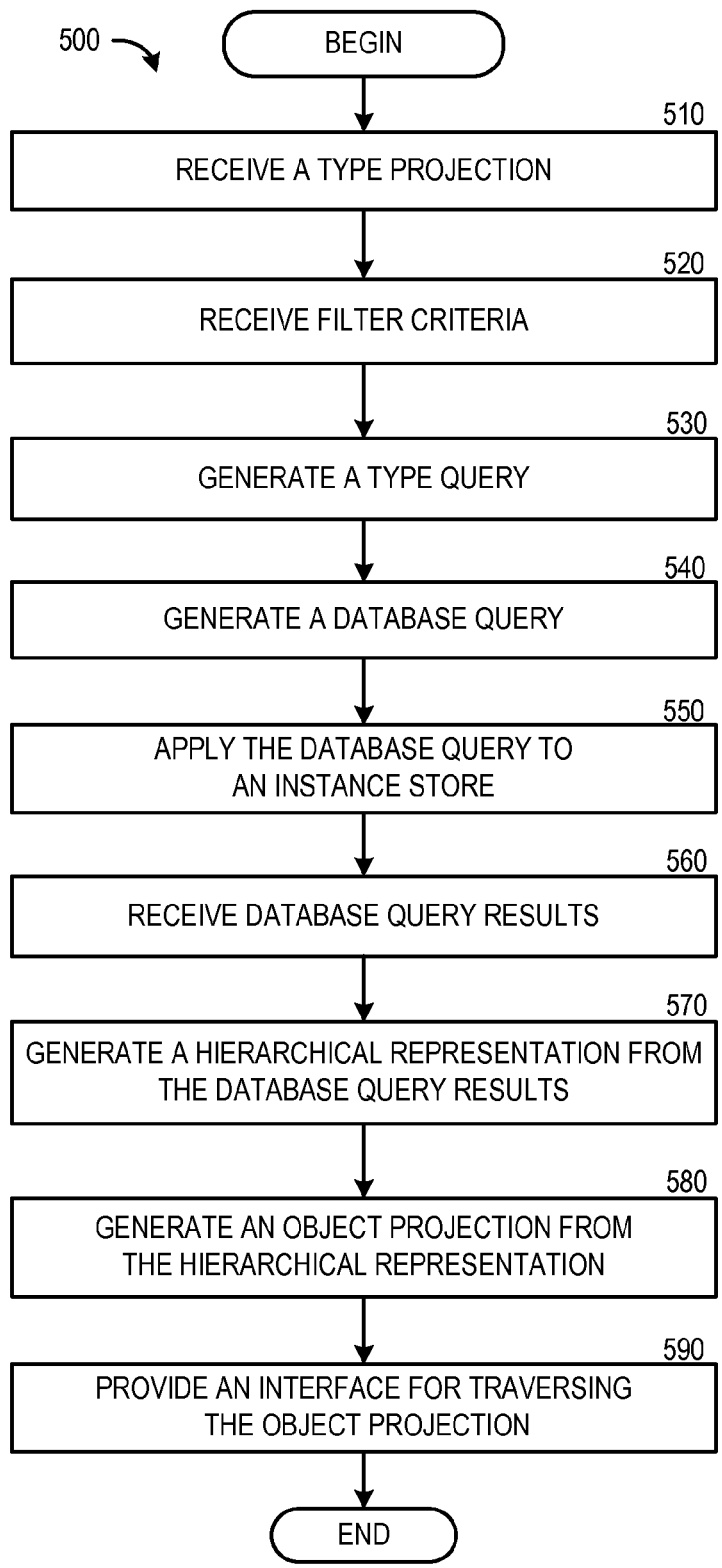
FIG. 5 is a flow diagram showing an illustrative process for type projection querying an instance space according to one or more embodiments presented herein.

Referring now to FIG. 5, additional details will be provided regarding the embodiments presented herein for querying an instance space according to instance types and relationship types. In particular, FIG. 5 is a flow diagram illustrating a method 500 for type projection querying an instance space according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may be performed sequentially, in parallel, or in a different order than as described herein.

The method 500 begins at operation 510 where the type projection query system 400 receives a type projection 200. The type projection 200 can be represented as a graph describing a hierarchy of instance types connected by relationship types. The graph represents the structure, or arrangement of relationships, to be matched and retrieved from the instance store 440.

At operation 520, the type projection query system 400 receives filter criteria 410. The filter criteria 410 may specify properties or groupings for any one of the instances or relationships within the type projection 200. The filter criteria 410 may be specified as a graph or as one or more paths within a graph.

At operation 530, the type projection query system 400 can generate a type query. The type projection 200 and a set of criteria 410 may be used by the query definition generator 420 to produce a type query or generic query. The query definition generator 420 can use information about how instances are stored in the instance store 440 to form a query strategy to satisfy the type projection 200 and the criteria 410.

At operation 540, the type projection query system 400 can generate a database query. The database query generator 430 can accept the generic query produced by the query definition generator 420 and then provide the specific database query language for retrieving information from the instance store 440.

At operation 550, the type projection query system 400 can apply the database query to the instance store 440. The database query provided by the database query generator 430 at operation 540 may be queried against the database housing the instance store 440. Security policies associated with the instance store 440 may be applied and honored during the type projection query.

At operation 560, the type projection query system 400 can receive database query results. The database query result set may be obtained from the database query performed at operation 550 against the instance store 440. When the instance store 440 is housed in an SQL database, these results may be a relational set of data.

At operation 570, the type projection query system 400 can generate a hierarchical representation from the database query results. The database query results received at operation 560 may be accepted by the hierarchical representation generator 450. The hierarchical representation generator 450 can generate a composite result by connecting the retrieved information regarding instances and relationships into a resultant subgraph 300 or other hierarchical representation of the query results.

At operation 580, the type projection query system 400 can generate an object projection 460 from the hierarchical representation. The object projection 460 may expose information detailing the resultant subgraph 300.

At operation 590, the type projection query system 400 provides a results interface 470 for traversing the object projection. The results interface 470 can expose any combination of the query results, the hierarchical representation, or the object projection. The resultant subgraph 300 may be traversed, or otherwise examined, to identify desired results of the type projection query. The results interface 470 may be implemented as any software, command, or protocol interface such as a library or an API. The method 500 may terminate after operation 590 or the method 500 may be repeated continuously or periodically.

Figure 6:
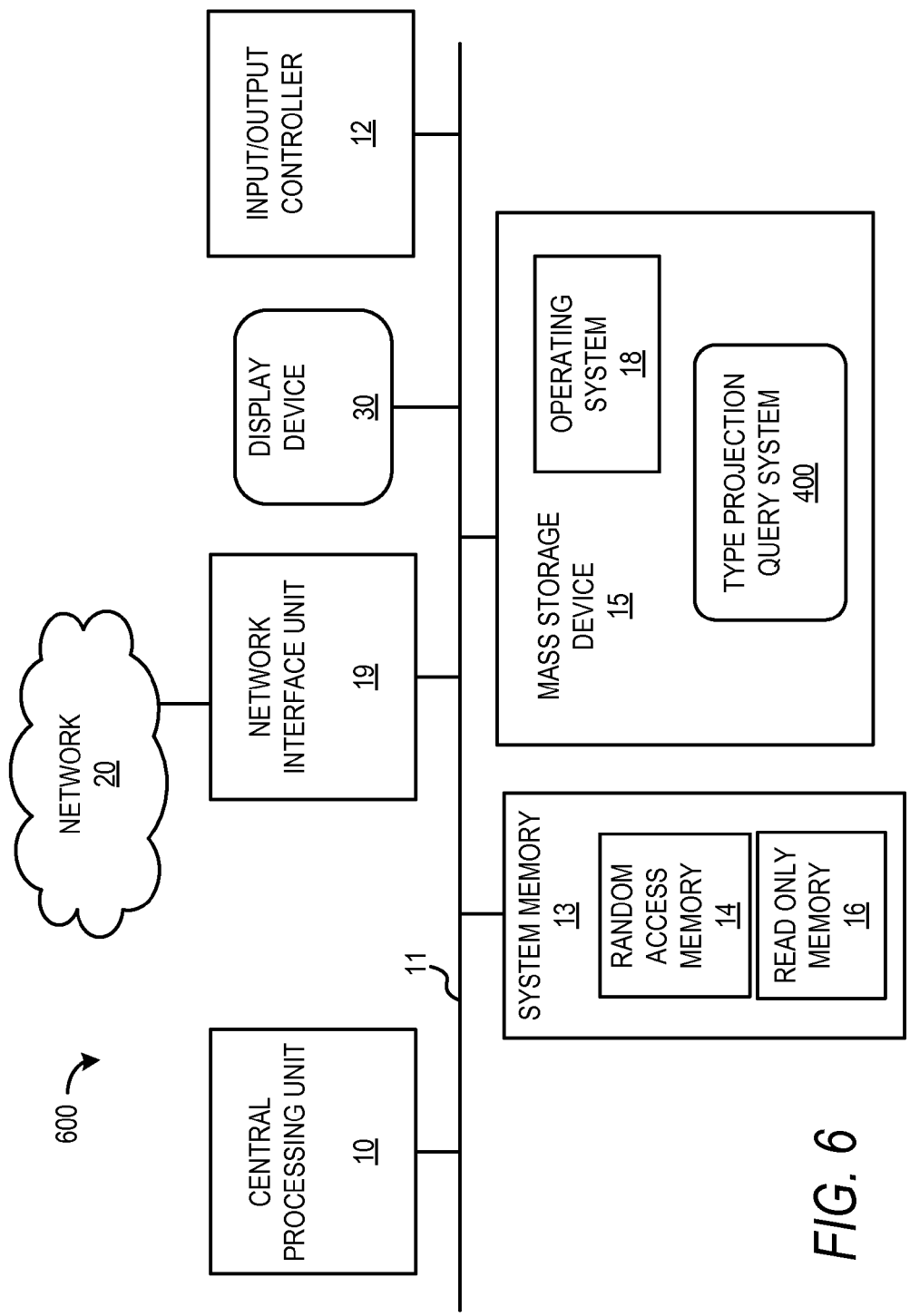
FIG. 6 is a computer architecture diagram showing an illustrative computer hardware architecture for a computing system capable of implementing embodiments presented herein.

Turning now to FIG. 6, an illustrative computer architecture 600 can execute software components described herein for type projection queries performed against an instance space within an instance store 440. The computer architecture shown in FIG. 6 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. The computer architecture 600 may apply to the computer executing the program modules associated with the type projection query system 400.

The computer architecture illustrated in FIG. 6 can include a central processing unit 10 (CPU), a system memory 13, including a random access memory 14 (RAM) and a read-only memory 16 (ROM), and a system bus 11 that can couple the system memory 13 to the CPU 10. The system memory 13 may provide memory 120 used for the type projection query system 400. A basic input/output system containing the basic routines that help to transfer information between elements within the computer 400, such as during startup, can be stored in the ROM 16. The computer 400 may further include a mass storage device 15 for storing an operating system 18, software, data, and various program modules, such as those associated with the type projection query system 400. The program modules can execute portions of software components, processes, and routines described herein.

The mass storage device 15 can be connected to the CPU 10 through a mass storage controller (not illustrated) connected to the bus 11. The mass storage device 15 and its associated computer-readable media can provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 20. The computer 600 may connect to the network 20 through a network interface unit 19 connected to the bus 11. It should be appreciated that the network interface unit 19 may also be utilized to connect to other types of networks and remote computer systems. The computer 600 may also include an input/output controller 12 for receiving and processing input from a number of other devices, including a keyboard, mouse, or electronic stylus (not illustrated). Similarly, an input/output controller 12 may provide output to, a printer, or other type of output device (also not illustrated). A display device 30 may be used for providing output from the computer 600 in the form of text, graphics, video, graphical user interface, any other user interface elements, or any combination thereof.

As mentioned briefly above, a number of program modules and data files may be stored in the mass storage device 15 and RAM 14 of the computer 600, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the program modules associated with the type projection query system 400 for execution by the CPU 10. The mass storage device 15, the ROM 16, and the RAM 14 may also store other types of program modules.

In general, software applications or modules such as those associated with the type projection query system 400 may, when loaded into the CPU 10 and executed, transform the CPU 10 and the overall computer 600 from general-purpose computing systems into special-purpose computing systems customized to perform type projection queries against an instance store. The CPU 10 may be constructed from any number of transistors or other discrete circuit elements, which may individually or collectively assume any number of states. More specifically, the CPU 10 may operate as one or more finite-state machines, in response to executable instructions contained within the software or modules. These computer-executable instructions may transform the CPU 10 by specifying how the CPU 10 transitions between states, thereby physically transforming the transistors or other discrete hardware elements constituting the CPU 10.

Encoding the software or modules onto the mass storage device 15 may also transform the physical structure of the mass storage device 15 or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for type projection queries against an instance store are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for querying an instance store according to instance types and relationship types, the method comprising computer-implemented operations for:
   generating a type query based on a type projection, the type projection comprising the instance types related by the relationship types, the instance types describing types of at least one of computers, peripherals, operating systems, or events;
   generating a database query based on the type query;
   applying the database query to the instance store;
   receiving results associated with the database query; and
   generating a hierarchical representation from the results.

2. A computer-readable medium having computer-executable instructions stored thereon which, when executed by a computer, cause the computer to:
   generate a type query based on a type projection, the type projection comprising instance types related by relationship types, the instance types describing types of at least one of computers, peripherals, operating systems, or events;
   generate a database query based on the type query;
   apply the database query to an instance store;
   receive results associated with the database query; and
   generate a hierarchical representation from the results.

3. A computer system comprising:
   a processing unit;
   a memory operatively coupled to the processing unit; and
   a program module which executes in the processing unit from the memory and which, when executed by the processing unit, causes the computer system to query an instance store according to instance types and relationship types by
      generating a type query based on a type projection, the type projection comprising instance types related by relationship types, the instance types describing types of at least one of computers, peripherals, operating systems, or events,
      generating a database query based on the type query,
      applying the database query to the instance store according to the type projection and specified criteria,
      receiving results associated with the database query,
      generating a hierarchical representation from the results, and
      providing an interface for exposing the results.

4. The computer-implemented method of claim 1, wherein applying the database query to the instance store comprises filter results based upon specified criteria.

5. The computer-implemented method of claim 1, wherein the instance store contains information related to a management system.

6. The computer-implemented method of claim 1, wherein the instance store contains information related to an information technology management system.

7. The computer-implemented method of claim 1, wherein the database query is a structured query language (SQL) query.

8. The computer-implemented method of claim 1, further comprising generating an object projection from the hierarchical representation.

9. The computer-implemented method of claim 1, further comprising providing an interface for traversing the hierarchical representation.

10. The computer-implemented method of claim 1, wherein generating the hierarchical representation comprises forming an object projection from the results.

11. The computer-readable medium of claim 2, wherein applying the database query to the instance store comprises filter results based upon specified criteria.

12. The computer-readable medium of claim 2, wherein the instance store contains information related to an instance space graph.

13. The computer-readable medium of claim 2, wherein the instance store contains information related to an information technology management system.

14. The computer-readable medium of claim 2, wherein the computer is further caused to generate an object projection from the hierarchical representation.

15. The computer-readable medium of claim 2, wherein the hierarchical representation is a resultant subgraph.

16. The computer-readable medium of claim 2, wherein the computer is further caused to provide an interface for traversing the hierarchical representation.

17. The computer-readable medium of claim 2, wherein the type projection is represented as a graph.

18. The computer-implemented method of claim 1, wherein the type projection is represented as a graph.

19. The computer-implemented method of claim 4, wherein the specified criteria is defined with respect to paths within the type projection.

20. The computer-readable medium of claim 11, wherein the specified criteria is defined with respect to paths within the type projection.

* * * * *